Dec. 14, 1943.  J. D. KREIS  2,336,737
FISHING REEL
Original Filed May 9, 1940
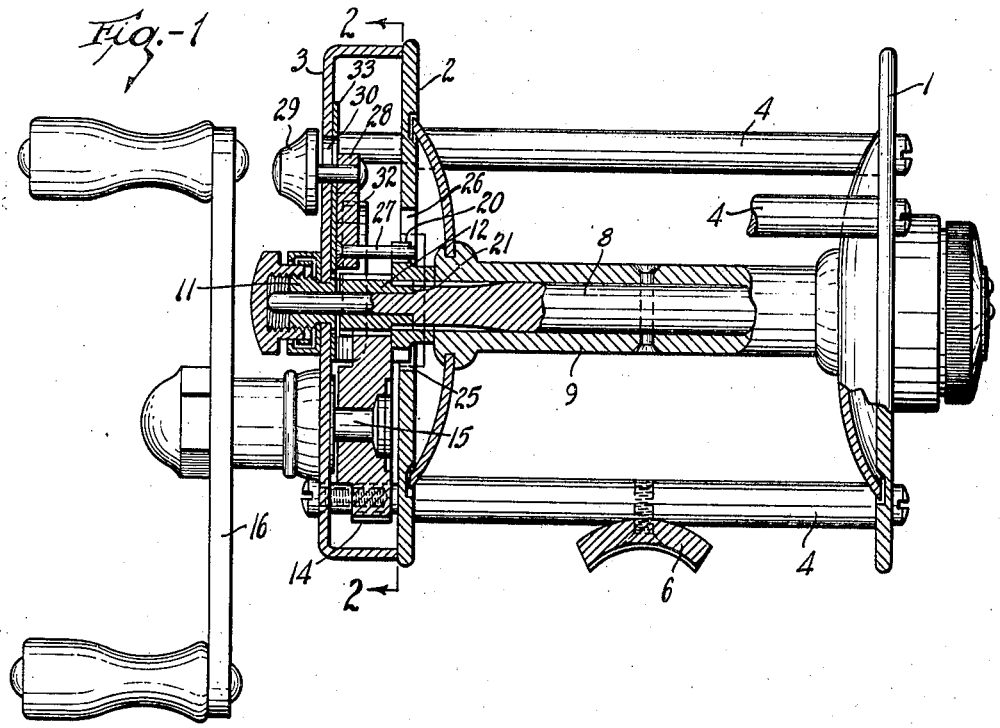
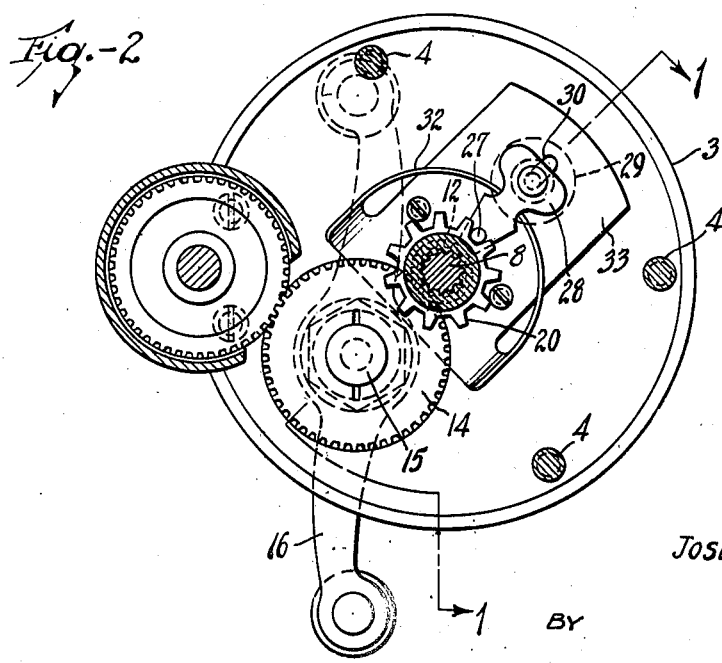
INVENTOR
JOSEPH D. KREIS
BY Ely & Frye
ATTORNEYS Patented Dec. 14, 1943

2,336,737

UNITED STATES PATENT OFFICE 2,336,737

FISHING REEL

Joseph D. Kreis, Cleveland Heights, Ohio, assignor to The Enterprise Manufacturing Company, Akron, Ohio, a corporation of Ohio Original application May 9, 1940, Serial No. 334,183, now Patent No. 2,306,258, dated December 22, 1942. Divided and this application February 5, 1941, Serial No. 377,473

7 Claims. (Cl. 242—84.6)

The present invention relates to the manufacture of fishing reels, particularly of the type in which there is employed a click mechanism. This attachment to a fishing reel is usually located on the back plate, but in the particular form of reel shown and described herein the reel is provided with a special type of drag mechanism located on the back plate which makes it undesirable to locate the click mechanism in its usual position. In the invention as shown and described herein, the click mechanism is transferred to the front of the reel. The invention relates to a particular construction whereby the click mechanism is located in the gear casing and this redesign of the reel structure is accomplished without increasing the overall dimensions of the reel.

It is also an object of the invention to improve and strengthen the connection between the spool pinion and the spool. In the generally accepted reel construction, the spool pinion is slotted transversely to receive a mating rib formed on the spool. This weakens the pinion materially and is the cause of breakage. In the present invention this connection is improved materially and the click pinion is adapted to a new purpose, which is to form a coupling between the pinion and the spool.

Other objects and advantages are realized by the invention disclosed herein, it being understood that the specific form of the invention shown has been selected as the best known or preferred form, but improvements and modifications may be made therein, all within the scope of the invention as set out in the appended claims.

This application is a division of my prior application, Serial No. 334,183, filed May 9, 1940, now Patent No. 2,306,258, of December 22, 1942, and which is directed to the drag mechanism.

In the drawing:

Fig. 1 is a side elevation of a reel structure embodying the invention, the front plate and gear casing being shown in section to illustrate the invention; and Fig. 2 is a section on the line 2—2 of Fig. 1.

It will be appreciated that in the description and drawing, a particular type of reel is shown, but the invention is not limited to this type of reel and may be employed in other forms of reels.

Referring to Fig. 1, the rear or back plate of the reel of the bait-casting type is marked 1, the front plate as 2, and the gear casing as 3. These elements of the reel are held together by the usual posts 4, and the usual screws to maintain the reel in assembled condition, a plate 6 being provided for mounting the reel upon the rod.

The main spool shaft 8 carrying the spool 9 is mounted in a bearing in the back plate and a bearing 11 in the gear casing and is driven through a pinion 12, fitted over the end of the shaft, from the main driving gear 14 mounted upon the stub shaft 15 in the gear housing and driven by the crank 16.

The means for securing the pinion 12 to the spool shaft 8 is one of the features of the invention and is designed to improve upon the usual construction employed at this point. In the ordinary reel the pinion 12, which is removable from the end of the shaft, is usually cut transversely to provide teeth or projections which fit a rib formed on the spool shaft, but the connection is unsatisfactory because the teeth break off easily. In the improved means for coupling the shaft and pinion, as shown herein, the click ratchet 20 is employed as a coupling or retaining ring connecting the pinion 12 and the spool shaft 8. This is a novel adaptation of the click ratchet which, in the design of reel shown, is located in the front end of the reel and is so constructed that it is employed as a coupling for the spool and the removable pinion which drives it.

The pinion 12 is received over the reduced end of the shaft 8 and rests against the shoulder 21 on the shaft. The main body of the shaft and the adjacent end of the pinion 12 are provided with a plurality of aligned grooves or teeth (see Fig. 2). The click ratchet spans both members and is provided with a plurality of mating teeth which engage with the grooves or teeth on the other members, and as the click ratchet is of substantial depth and engages both members over approximately one-half of its depth, the arrangement affords a stronger and more secure coupling between the spool and its pinion than has been possible with earlier reel constructions.

The location of the click pinion and its use as a coupling between the spool places the click pinion in the plane of the front end plate 2 where an enlarged axial opening 25 is provided to receive it, said opening being formed with a further cutout portion 26 to afford movement to the click pin. This pin is shown at 27 and is carried on the sliding block 28 mounted on the inside wall of the gear casing, being moved into and out of clicking position by the knob 29 working in slot 30 in the gear casing. It will be seen that in order to accommodate the click mechanism in the gear casing, it has been necessary to make a new arrangement of the parts of the reel and to extend the pin outwardly from its block and into the opening in the end plate 2.

The block 28 is pivoted on the shank of the knob 29 and yieldingly held in neutral position by the long curved spring arms 32 which are bent upwardly and formed as a part of the plate 33 which lies beneath the block and is attached to the gear casing.

The foregoing has described the best known and preferred form of the invention, but it will be appreciated that other forms and modifications may be resorted to without departing from the principles of the invention as set forth in the appended claims.

What is claimed is:

1. In a fishing reel, a spool shaft having a reduced end, a driving pinion on the end of the shaft, a coupling extending over a portion of the spool shaft and the driving pinion and having non-rotative connection with both the spool shaft and the driving pinion, and opposed means on the spool and pinion to prevent any axial movement of the coupling.

2. In a fishing reel, a spool shaft having a reduced end, a driving pinion on the end of the shaft, and a click ratchet extending over a portion of the spool shaft and the driving pinion and having non-rotative connection with both the spool shaft and the driving pinion.

3. In a fishing reel, a front end plate and a gear casing, a spool shaft extending through the end plate and having a bearing in the casing, a driving pinion on the shaft, a click ratchet on the shaft and located between the pinion and the spool in an opening in the end plate, said ratchet disposed in part at least within the plane of said end plate, and a slidably shiftable click pin movable radially of the ratchet carried on the inner face of the gear casing and extending into said opening.

4. In a fishing reel, a front end plate and a gear casing, a spool shaft extending through the end plate and having a bearing in the casing, a spool driving pinion and a click ratchet located side by side on the shaft, a movable block carried on the inner face of the casing, and a click pin carried by the block and projecting laterally therefrom parallel to the spool shaft movable into and out of engagement with the click ratchet.

5. In a fishing reel, a front plate, a rear plate and a gear casing on the front plate, a spool shaft, an aperture in the front plate, a click pinion on the spool shaft and located in the aperture in the front plate, a spool driving pinion located beside the click pinion, a block on the interior of the gear casing shiftable radially with relation to said shaft, and a click pin on the block projecting laterally therefrom into the aperture in the front plate and movable into and out of engagement with the click pinion.

6. In a fishing reel, a front plate, a rear plate and a gear casing on the front plate, a spool, a spool shaft having a bearing in the gear casing, a pinion on the shaft adjacent the spool, and a sleeve surrounding the pinion and the spool shaft and interlocked to both said members to preclude relative rotary movement therebetween, said sleeve confined in fixed axial position by a portion of the pinion and the end of the spool.

7. In a fishing reel, a front plate, a rear plate and a gear casing on the front plate, a spool, a spool shaft having a bearing in the gear casing, the front palte having an opening through which the spool shaft passes, a pinion on the shaft adjacent the spool, a coupling member located in the opening and surrounding the pinion and the spool shaft and interlocked with said members, the exterior of the coupling member having teeth, and a click pin mounted on the interior of the gear casing and engageable with the coupling member.

JOSEPH D. KREIS.